United States Patent [19]

Stevens

[11] Patent Number: 5,264,823
[45] Date of Patent: Nov. 23, 1993

[54] POWER LINE COMMUNICATION SYSTEM

[75] Inventor: Carlile R. Stevens, Alamo, Calif.

[73] Assignee: Motorola Lighting, Inc., Buffalo Grove, Ill.

[21] Appl. No.: 970,535

[22] Filed: Nov. 2, 1992

Related U.S. Application Data

[63] Continuation of Ser. No. 589,472, Sep. 28, 1990, abandoned.

[51] Int. Cl.⁵ .................... H04B 3/00; H04L 27/00
[52] U.S. Cl. ........................ 340/310 A; 340/310 R
[58] Field of Search ........ 340/310 R, 310 CP, 310 A; 455/3.3; 375/37

[56] References Cited

U.S. PATENT DOCUMENTS

| | | | |
|---|---|---|---|
| 4,097,692 | 6/1978 | Felix | 340/310 R |
| 4,106,007 | 8/1978 | Johnston et al. | 340/310 R |
| 4,300,126 | 11/1981 | Gajjar | 340/310 R |
| 4,348,582 | 9/1982 | Budek | 340/310 R |
| 4,400,688 | 8/1983 | Johnston et al. | 340/310 R |
| 4,408,185 | 10/1983 | Rasmussen | 340/310 R |
| 4,914,418 | 4/1990 | Mak et al. | 340/310 R |
| 5,005,187 | 4/1991 | Thompson | 340/310 R |

Primary Examiner—Donnie L. Crosland
Attorney, Agent, or Firm—J. Ray Wood

[57] ABSTRACT

Data is transmitted on a power line as a momentary interruption of the power at or near the zero crossing of the current. The interruption is preferably a small fraction of the period of the frequency of the power line. The data is transmitted only to those devices in series circuit with the transmitter. The transmitter combines 60 Hz and 120 Hz clock signals with data from a shift register to interrupt current in a predetermined pattern, in which an interruption of both the positive going and negative going zero crossings define a logic "1" and the absence of interruptions is a logic "0." A data prefix identifies succeeding bits as data. The receiver produces a pulse width modulated signal in response to the data.

12 Claims, 5 Drawing Sheets

POWER LINE COMMUNICATION SYSTEM

This is a continuation of application Ser. No. 07/589,472 filed Sep. 28, 1990 and now abandoned.

BACKGROUND OF THE INVENTION

The present invention relates to a power line communication system and, in particular, to a system for controlling ballasts for gas discharge lamps, such as fluorescent lamps.

BRIEF DESCRIPTION OF THE PRIOR ART

In virtually all commercial installations, lamps are turned on as soon as they are needed for illumination and turned off when the last person leaves, including maintenance workers. A large number of these installations also receive natural light.

Recently it has become economically feasible to provide control means for turning off the lamps when daylight is adequate. Devices are now on the market for reducing artificial light in proportion to the amount of daylight received.

Typically, such control means utilize low voltage control wiring which must be added to the lighting system to supply the signal for controlling the luminosity of the lamps in the system. The installation cost of the additional wiring often renders the system ineffective in terms of cost savings.

Since the lamps are already connected to the power distribution system, installation costs could be reduced significantly if the control signal were transmitted over the power lines. Most power distribution systems in the world operate at fifty to sixty hertz. By superimposing a much higher frequency carrier signal for the control commands, the power distribution system is used instead of the additional, low voltage control wiring.

Power line communication systems have three basic drawbacks: noise, isolation, and complexity. The power distribution system normally contains a great deal of electrical noise, both natural and man-made. This noise interferes with the readability of the carrier signal superimposed on the system and requires multiple transmissions of the same data to assure that the receiving device responds correctly to the transmitted signal. Once the signal is placed on the line, it appears everywhere on the distribution system. To prevent this, isolation devices must be inserted in series with the power distribution system and carry the full current thereof. Such devices are expensive, both initially and to maintain. In some cases, there is crosstalk between buildings on the same power distribution system. Because of the complexity needed to assure reliable performance, these communication systems are expensive, which reduces the number of applications in which they can be used.

OBJECTS OF THE INVENTION

In view of the foregoing, it is an object of the present invention to provide a means for sending data over a power line to a predetermined group of devices without crosstalk.

It is another object of the present invention to provide a carrier-free power line communication system.

It is a further object of the present invention to provide both a transmitter and a receiver that are small and economical enough to provide a viable alternative to hard-wired systems.

In accordance with another aspect of the present invention, it is an object of the present invention to structure the data such that each device downstream from the transmitter can be controlled independently.

In accordance with still another aspect of the present invention, it is an object of the present invention to provide receiver means adapted to detect notches at other than zero crossings of the AC power line.

SUMMARY OF THE INVENTION

In accordance with the present invention, data is transmitted as a momentary interruption of the power. Since the interruption occurs at or near the zero crossing of the current, little actual power is lost. Power loss is further minimized in that the interruption is preferably on the order of one or two milliseconds, a small fraction of the period (seventeen to twenty milliseconds) of the frequency of the power line. The data is transmitted only to those devices located downstream from the transmitter or transmitter. This eliminates the problem of isolation. The receiver detects the interruptions in the current and interprets a certain pattern as a logic "ones" and "zeroes." If the pattern fits a programmed pattern, the receiver responds as directed. Because of the simplicity of the present invention, inexpensive components can be used to implement the invention.

BRIEF DESCRIPTION OF THE DRAWINGS

A more complete understanding of the present invention can be obtained by considering the following detailed description in conjunction with the accompanying drawings, in which.

DETAILED DESCRIPTION OF THE INVENTION

In a preferred embodiment of a communication system in accordance with the present invention, transmitter 13 is connected across power lines 11 and 12, which may be referred to herein as "supply" and "common," respectively. The output of transmitter 13 sends information over the power lines to a receiver, such as receiver 14, by momentarily interrupting the power through the lines. Receiver 14 detects the interruptions in current or voltage and produces a control signal on line 16. In a preferred embodiment of the present invention, this control signal comprises a pulse width modulated signal proportional to the desired brightness of a lamp. Load 17 can comprises any suitable device, such as an electronic ballast responsive to the control signal to vary the brightness of the lamp(s) connected thereto. In the simplest embodiment of the present invention, load 17 can comprise an incandescent lamp, or a fluorescent lamp with a conventional ballast, connected between lines 12 and 16.

Figure 3:
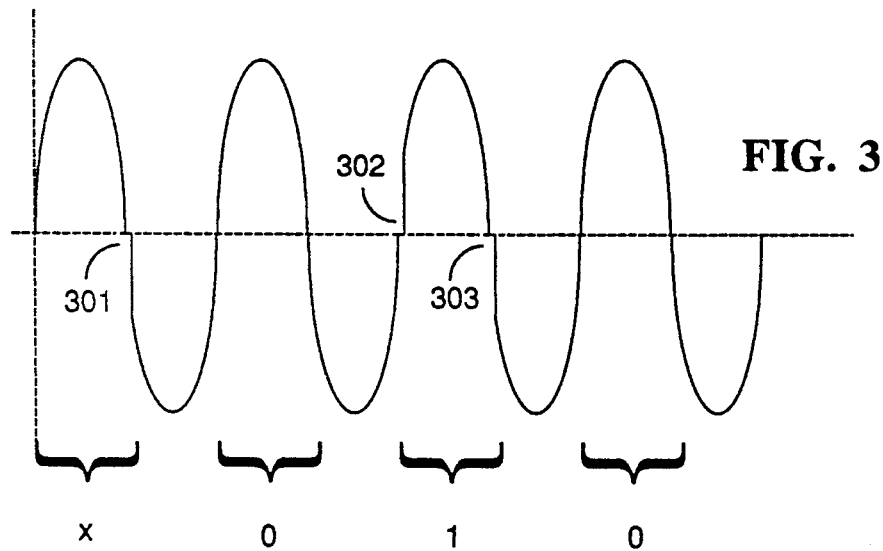
FIG. 3 illustrates waveforms showing the operation of the transmitter.
Figure 2:
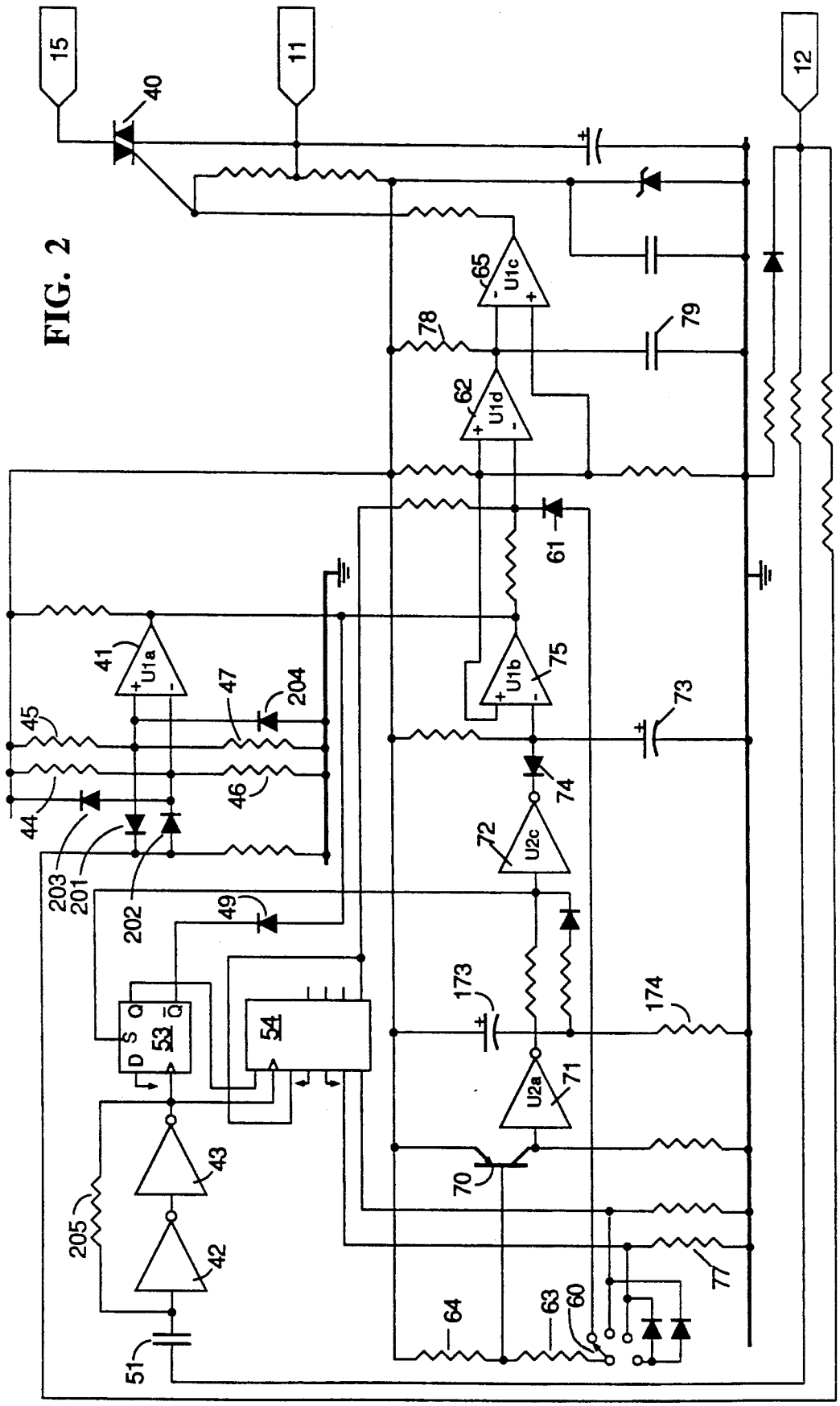
FIG. 2 illustrates a preferred embodiment of a transmitter in accordance with the present invention.

A preferred embodiment of transmitter 13 is illustrated in FIG. 2. Supply line 11 and load line 15 are interconnected by bi-directional switch 40, illustrated as a triac. Triac 40 is normally conducting, coupling full power to the devices connected downstream therefrom. The circuitry of FIG. 2, connected to the gate of triac 40, provides a series of pulses of predetermined time and line, to form a series of interruptions or notches at approximately the zero crossings to provide a data word for a receiver. These are illustrated in FIG. 3 as notches 301-303.

The notch is preferably approximately 1.2 milliseconds in duration and occurs on both the positive and negative half cycles of line current. In implementing the present invention, the occurrence of a notch in the positive half cycle followed by a notch in the negative half cycle is defined as a "one" data bit. The absence of notches is defined as a "zero" data bit. Any other pattern is ignored, illustrated in FIG. 3 as an "x" indicating a mismatch or "don't care". It is understood by those of ordinary skill in the art that this definition is arbitrary and any other consistent definition is suitable. The data word sent by the transmitter represents the power level to be applied to a load.

Timing for the pulses is provided by a zero crossing detector comprising comparator 41 and the circuitry associated with the input thereof, and by cascaded inverters 42 and 43 which act as a square wave clock generator synchronized with the AC waveform applied to the input thereof. Specifically, comparator 41 has resistors 44-47 connected as shown to the inputs thereof. Diodes 201 and 202 steer the positive and negative half cycles of the AC line to the appropriate input of comparator 41. Diodes 203 and 204 provide suitable clamping. Resistors 44 and 47 are preferably of the same value and of a value greater than resistors 45 and 46 respectively. Because of the relative values of the resistors, comparator 41 produces a pulse at each zero crossing of the AC line current when the voltage thereof is within the narrow range defined by resistors 44-47. Comparator 41 produces a series of pulses at a frequency of 120 Hz.

Timing is also provided by cascaded inverters 42 and 43. The input of inverter 42 is connected by capacitor 51 and resistor 52 to the "common" terminal (line 12). The values of these components are chosen to provide approximately a 30 degree phase shift, or delay, of the signal applied to the input of inverter 42. Inverters 42 and 43 form a Schmitt trigger, as well known per se in the art, with the hysteresis supplied by the coupling of the output of inverter 43 to the input of inverter 42 by resistor 205, producing a 60 Hz. square wave.

The output of inverter 43 is coupled to the clock inputs of D-flip flop 53 and shift register 54. Shift register 54 has four data inputs $D_0$-$D_3$ and preferably has a parallel load, serial output capability. The $D_0$ input is tied high, that is, it is coupled to the positive supply voltage. The $D_1$ data input is tied low, that is, it is coupled to ground. When read out serially, this one-then-zero sequence defines a fixed prefix identifying subsequent zero crossings as data. The $D_2$ and $D_3$ data inputs are connected to switch 60 which selectively connects these inputs to high or low voltages to form the binary codes for decimal 0-3.

The Q output of D-flip flop 53 is coupled to the parallel load input of shift register 54. The data presented at inputs $D_0$-$D_3$ is stored in shift register 54 upon a positive going pulse from inverter 43, if the Q output of D-flip flop 53 is high. The $Q_3$ output (most significant bit) of shift register 54 is coupled to the serial input for reloading data when shift register 54 is operating in the serial mode. In the case where switch 60 is in the uppermost (off) position, diode 61 clamps the inverting input of comparator 62 high through resistor 63 and 64. This drives the output of comparator 62 low which, in turn, drives the output of comparator 65 high, which turns off triac 40 so that no power flows to the load.

When switch 60 is moved to the next position, a pulse is produced through transistor 70 and inverter 71 to the S input of flip flop 53. This causes the Q output of flip flop 53 to go high, which causes a parallel loading of the data into shift register 54 on the next clock cycle. The $\overline{Q}$ output is low while waiting for the next clock pulse. This clamps the outputs of comparators 41 and 75 low through diode 49, preventing any notches until proper data is loaded into shift register 54. In this data, input $D_0$ always equals a logic 1 because that input is tied high. Input $D_1$ is always 0 because that input is tied low. Input $D_2$ remains zero since it is coupled to ground through resistor 77. Input $D_3$, however, is now a logic 1 since the input resistor is now coupled through resistors 63 and 64 to the supply voltage. Thus, upon completion of the parallel load, the binary data 1001 is contained in shift register 54. In addition, diode 61 is no longer clamping the inverting input of comparator 62 to the supply voltage.

The change in switch position causes a pulse to appear at the S input of flip flop 53 as previously described. In addition, this pulse causes the output of inverter 72 to go low, discharging capacitor 73 through diode 74. The low voltage at the input of comparator 75 causes the output to go high. Actually it is more correct to say that the output of comparator 75 becomes open, since the comparators preferably have what are known as an open collector outputs.

Since the output of comparator 75 has become open, zero crossing pulses from comparator 41 are applied to the inverted input of comparator 62. In addition, the output from shift register 54 is applied to the input of comparator 62. The combination of these two signals produces a pair of notches at the zero crossings of a single cycle of the AC line voltage by momentarily disabling triac 40. The duration of the individual notches is determined by the time constant of RC network 78, 79. The data in shift register 54 is read out serially in this manner and transmitted to the load devices connected downstream from triac 40. During this time, capacitor 73 is recharging and eventually reaches a potential which causes the output of comparator 75 to go low, terminating the generation of notches. Thus, capacitor 73 and comparator 75 comprise a burst timer which determines the duration of the data burst. In a data burst, the data is sent two or three times, for example, for reliability.

The remaining two switch positions operate similarly, except that the particular data sent is different. Specifically, in the next position, the data sent is 0101. In the next and lower most position, the data sent is 1101, indicative of full power.

The first and second bits, reading from the right, must always be one and zero, respectively, for the data to be recognized as valid by a receiver. While this four bit word provides three power levels (and off) or "on" and "off" data for two locations, it is apparent that a larger word can be used to provide more levels and/or greater address capability. For example, an eight bit word enables one to obtain sixteen levels of power and four zones of control. The word comprises eight bits representing the following data.

| bit  | 7 | 6 | 5 | 4 | 3 | 2 | 1 | 0 |
|------|---|---|---|---|---|---|---|---|
| data | y | y | x | x | x | x | 0 | 1 |

Wherein "y" represents the address of one or more receivers responding to one of the four possible codes and "x" represents one of sixteen levels of power.

In order to assure reliability in the system as described, data is sent upon start-up and upon any transient which could upset the operation of the receiver. This function is performed by capacitor 173 and resistor 174. Upon start-up, capacitor 173 begins to charge and has a low voltage drop across it. This forces the input of inverter 72 high, which resets the previously described burst timer and sets flip-flop 53, which causes data to be set into shift register 54 via the Q output, as previously described. A voltage transient on the power line has the same effect as start-up since the transient is coupled through capacitor 173 to do the same thing as just described.

Figure 1:
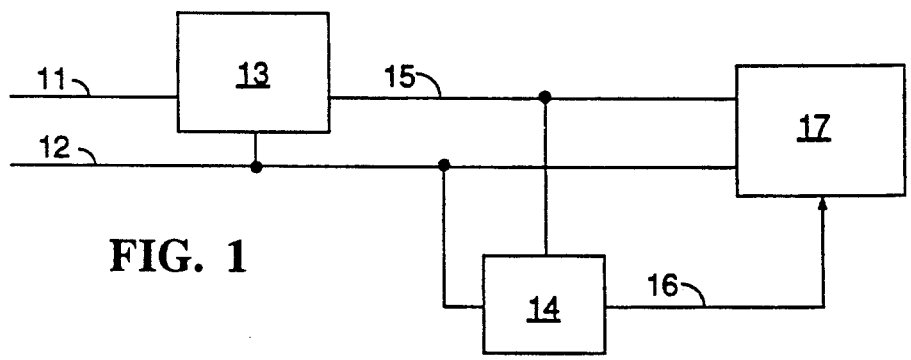
FIG. 1 illustrates a communication system in accordance with the present invention.
Figure 4:
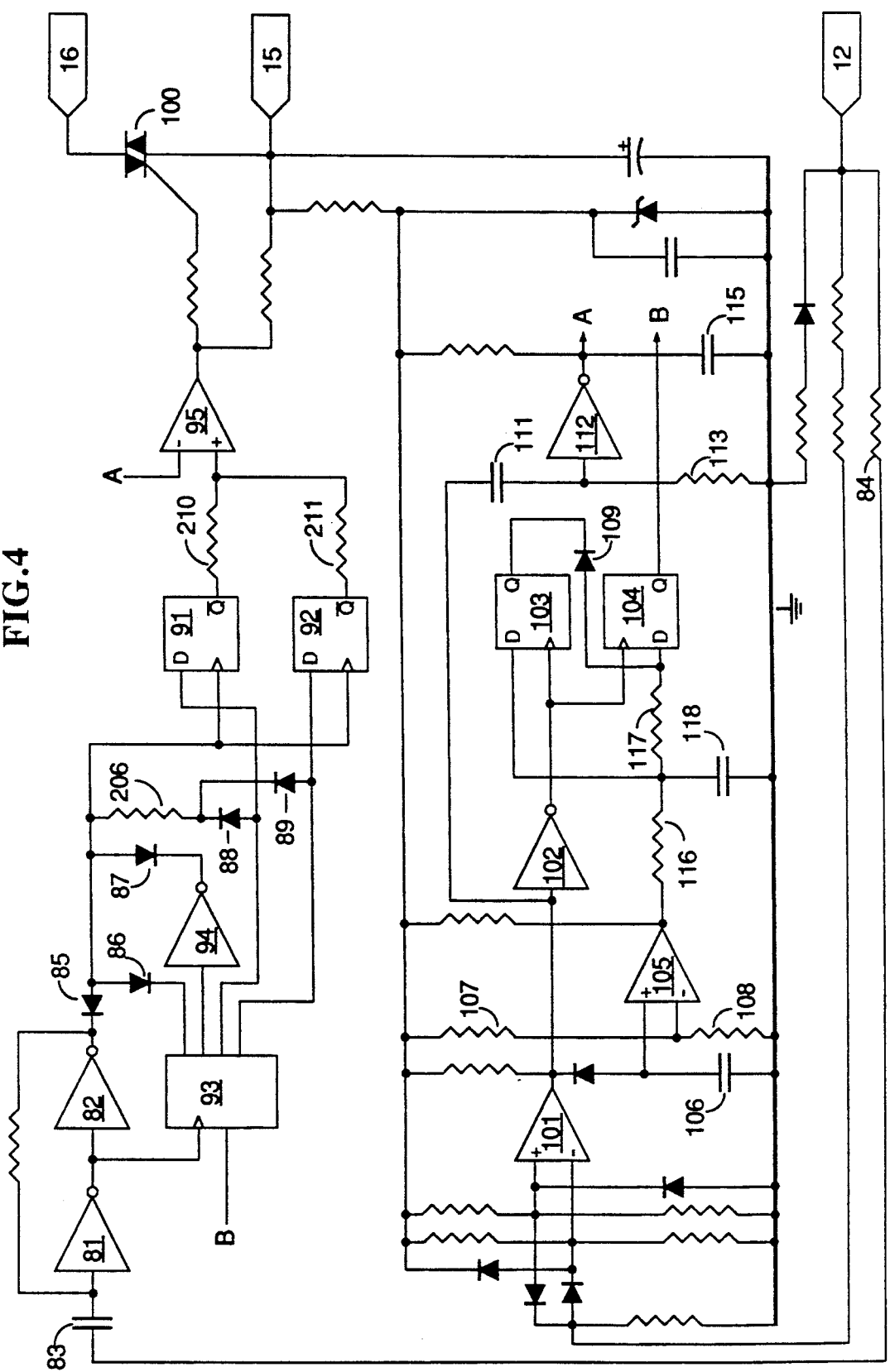
FIG. 4 illustrates a preferred embodiment of a receiver in accordance with the present invention.

As illustrated in FIG. 1, the notches are transmitted downstream from transmitter 13 to load device 17. The transmission of pulses represents a reduction of a few percent in the available power to load 17 only during the burst of data. In accordance with the present invention, a receiver is connected downstream from transmitter 13 for detecting the notches in the current or voltage on the supply lines and producing a control signal on line 16. FIG. 4 illustrates a suitable receiver.

In FIG. 4, some portions of the receiver circuit are structurally similar to portions of the transmitter circuit but actually provide a slightly different function. For example, the zero crossing detector circuitry, while producing pulses at 120 Hz, produces pulses of different durations depending upon whether or not a notch is present on the line. Similarly the clock circuitry for generating a 60 Hz clock signal is similar to the transmitter clock.

Specifically, cascaded inverters 81 and 82 are connected to the "common" line by capacitor 83 and resistor 84 which provide approximately a thirty degree phase shift in the signal applied to inverter 81. The output of inverter 82 is coupled to the input of inverter 81 to provide positive feedback for hysteresis. The output of inverter 82 provides a 60 Hz clock signal which is coupled, via the AND gate comprising diodes 85, 86, 87 and resistor 206, to the clock inputs of flip flops 91 and 92. The inverted clock signal is applied to the clock input of shift register 93.

Diodes 85-89 provide both a clamping and a logical AND function for coupling the clock signal to the inputs of flip flops 91 and 92. Specifically, the diodes are arranged so that the first data bit from shift register 93, which is operating in a serial output mode, must be a logic "1". The second data bit is inverted by inverter 94 and therefore must be a logic "0". The remaining bits can be either a 1 or a 0 as indicated by isolation resistor 95. Because of the timing of the clock signal into shift register 93 versus the occurrence of pulses at the shift input, only a positive going zero crossing notch followed by a negative going zero crossing notch will occur at the right time to be shifted through register 93. If the first two bits are 1 and 0, respectively, and either of the other bits is a logic 1, then a pulse is applied to the clock input of flip flops 91 and 92.

Flip flops 91 and 92 act as a storage register for storing the third and fourth bits from shift register 93. If either of these bits is a logic 1, the inverted ($\overline{Q}$) output of the corresponding flip flop causes the output of comparator 95 to go low, which causes triac 100 to conduct. The duration of the output pulse from comparator 95 is also determined by the other input labeled "A" in FIG. 4, as discussed below. Resistors 210 and 211 act as a summation network at the non-inverting input of comparator 95. Their values are adjusted to control the output duty cycle depending on which output is high or low. For example, resistor 210 has a resistance of 100 kΩ and resistor 211 has a resistance of 150 kΩ. This combination produces a three level output to comparator 95 and three different duty cycles. Data 00 (OFF) is not actually transmitted, as described above. If it were, it would result in zero duty cycle, i.e. off.

Comparator 101 functions as previously described, in conjunction with the diode-resistor network connected to the input therein, for sensing the zero crossing of the input waveform. Depending upon the values chosen for the resistor, the duration of the pulse produced by comparator 101 is approximately the same as the pulse produced by inverter 41 in FIG. 2, assuming that no notch exists in the voltage. If a notch exists, the duration of that pulse is increased (since the voltage remains zero for a slightly longer time), although the frequency remains the same (120 Hz). The output from comparator 101 is inverted by inverter 102 and applied to the clock inputs of flip flops 103 and 104.

Comparator 105 operates as a pulse width detector for sensing the duration of the pulse from comparator 101 and, hence, the present or absence of a notch. Specifically, upon a zero crossing, the output of comparator 101 goes high and stays high for a period depending upon whether or not there is a notch. During the time in which the output from comparator 101 is high, capacitor 106 charges, increasing the voltage thereon. If the output from comparator 101 stays high long enough, it will exceed the comparison voltage determined by resistors 107 and 108. When this voltage is exceeded, the output from comparator 105 goes high and this signal is coupled to the data inputs of flip flops 103 and 104.

Resistor 116 and capacitor 118 provide a propagation delay to assure that the data inputs to flip flops 103 and 104 will not go low before the clock signal goes high. Depending upon components chosen this network could be eliminated.

The Q output from flip flop 103 is connected via diode 109 to the data input to flip flop 104. Diode 109 and resistor 117 at the input to flip flop 104 provides an AND logic function. The Q output of flip flop 103 must be high for the next pulse from comparator 105 to pass. Thus, flip flops 103 and 104 acts as a two bit register for detecting consecutive pairs of notches. The output from flip flop 104 is coupled to the serial input of shift register 93.

The output from comparator 101 is also coupled by way of capacitor 111 to the input of inverter 112. Capacitor 111, resistor 113, and comparator 95 form a timer to determine the portion of each half cycle in which triac 100 is conducting. The output of inverter 112 is coupled to the inverting input of comparator 95, labeled "A". The time it takes to charge capacitor 115, and the quantity stored in flip flops 91 and 92 determine the duration of the pulse applied to triac 100.

For example, using the resistance values described above, if a logic 1 is stored in both of registers 91 and 92, the duration of the pulse applied to triac 100 is continuous. If only one of flip flops 91 and 92 contain a logic 1, the duration of the pulse applied to triac 100 is shorter. Specifically, considering flip flops 91 and 92 as a storage register, if the binary equivalent of a decimal "2" is stored, then the output to triac 100 is approximately two-thirds the duration of the 60 Hz line voltage. If the contents of the storage register is the binary equivalent of a decimal "1", then the duration of the signal applied to triac 100 is approximately one-third the period of 60 Hz. The data is read continuously until new data is received. Thus, the load is powered by a pulse width modulated signal.

Figure 5:
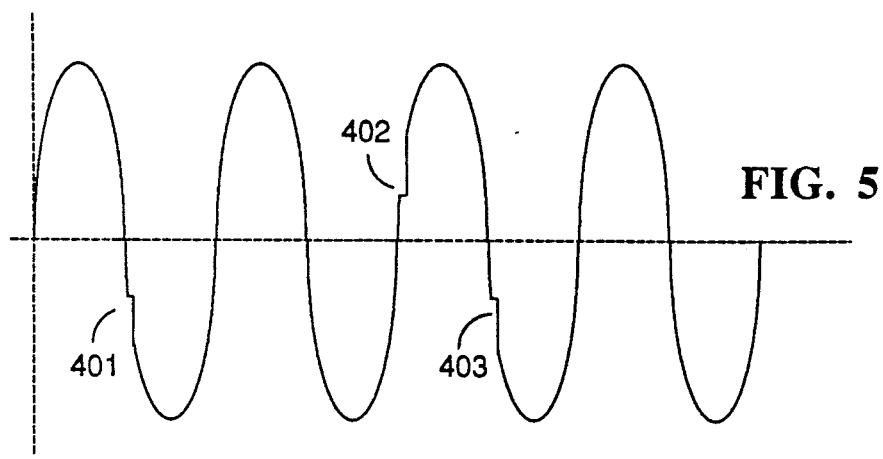
FIG. 5 illustrates waveforms showing the operation of the system with reactive loads.

Returning to FIG. 1, if load 17 is not nearly a pure resistance, then opening a switch within transmitter 13 may not terminate the flow of current within circuitry located downstream from the transmitter. Current will be supplied by the energy stored in the reactive components of the load(s). The net effect, as seen by the receiver(s) is that the notch moves up along the waveform, away from the zero crossing. Also, since the current in a circuit is a net current, i.e. currents from individual components are summed, notches 401-403 no longer go to zero, as illustrated in FIG. 5. One then must recognize a notch at other than zero crossing. There are basically two ways to do this. One is by pattern recognition of some sort and the other is by Fourier analysis. Considering the latter first, since a pure sine wave has zero high order coefficients under Fourier analysis, one performs a fast Fourier transform of the waveform and looks for selected high order coefficients to detect a notch.

Figure 6:
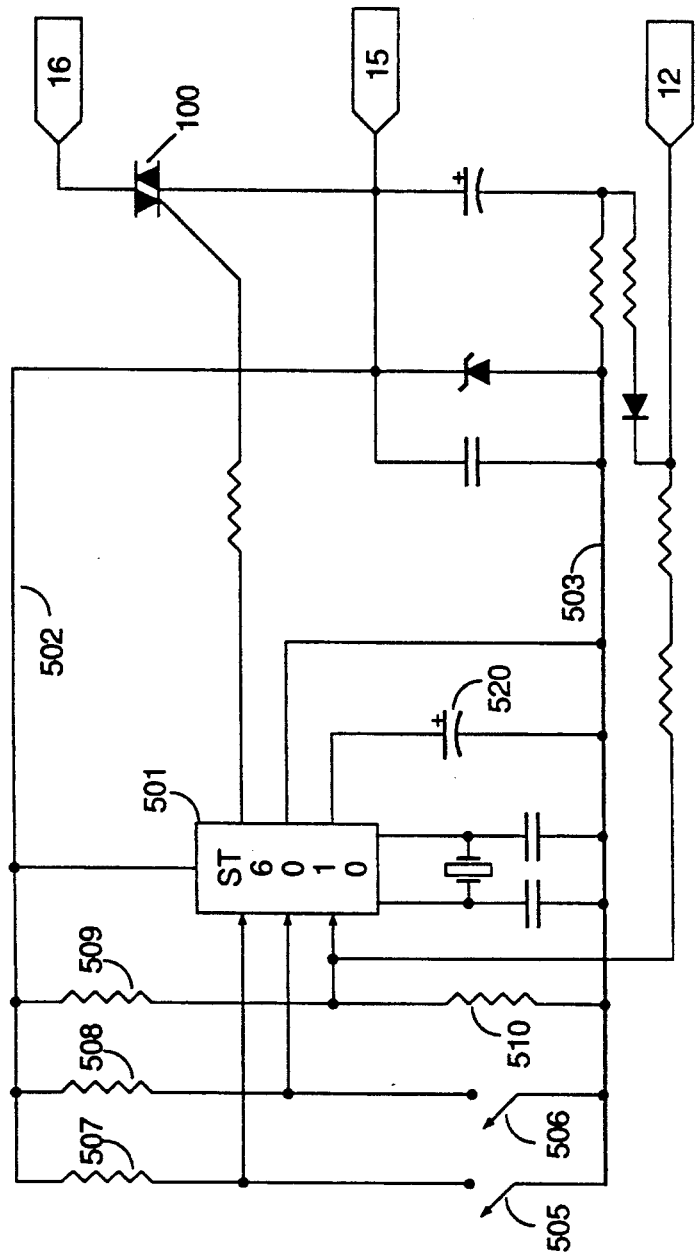
FIG. 6 illustrates a preferred embodiment of a microcontroller used as a receiver in accordance with the present invention.

FIG. 6 illustrates the first alternative wherein the amplitude of a sine wave at various times is stored in the memory of a microcontroller. To detect a notch, the amplitude of the waveform is sampled and compared to the stored data. A difference greater than a predetermined amount is interpreted as a notch.

Specifically, microcontroller 501 is connected between power supply rails 502 and 503, which are coupled to lines 15 and 20 through voltage dropping resistors. A negative supply voltage is developed from line 12 to provide negative voltage turn-on for triac 100. This avoids what is known as "fourth quadrant operation" of the triac (where the gate is positive and the anode is negative).

Switches 505 and 506 are each coupled to an input of microcontroller 501 and to pull-up resistors 507 and 508, respectively. These switches define the address of the particular receiver for zone control purposes. The third input to microcontroller 501 is connected to the "common" line, the voltage on which varies relative to the positive supply voltage on line 15/502. Resistors 509 and 510 act as a voltage divider to center this voltage between rails 502 and 503.

Capacitor 520, initially discharged, is a timing capacitor connected to a reset input of microcontroller 501. When power is first applied, or after a power outage, capacitor 520 charges. The initial low voltage resets the microcontroller. Thereafter, the reset input goes high and the microcontroller functions normally. The clock for controller 501 is conventional, comprising the crystal, or resonator, and capacitors illustrated. Microcontroller 501, in a particular embodiment of the present invention, comprised an ST6010 microcontroller as sold by SGS/Thomson. This controller has programmable inputs which can provide analog input to an internal analog-to-digital converter. After initial synchronization, the line voltage is sampled and compared to a predetermined set of data to determine whether a complete or an incomplete sine wave is present. Appendix I, which forms a part of this disclosure, is the source code used for implementing the receiver with an ST6010. The "#A/D" routine works with any input port programmed as an analog input.

Figure 7:
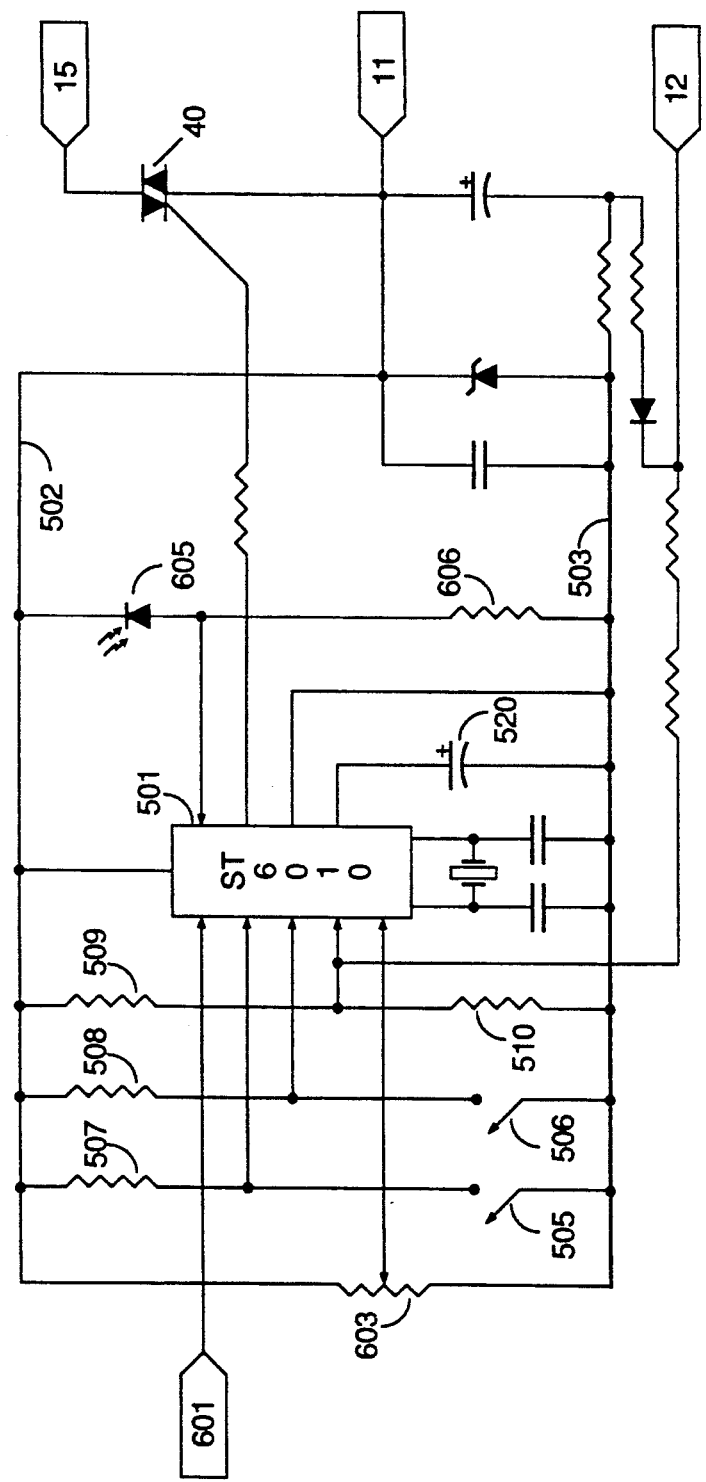
FIG. 7 illustrates a preferred embodiment of a microcontroller used as a transmitter in accordance with the present invention.

FIG. 7 illustrates the corresponding transmitter using a microcontroller. As is apparent from a comparison with FIG. 6, the structure of the transmitter is essentially the same as that of the receiver, with the following additional inputs used. Analog input 601 provides an interconnection to an external energy management system. A signal on this line controls the power to the load. Alternatively, or additionally, the input switches are used for either power level or zone selection. If used for power level selection, the two switches provide three discrete levels of power (and OFF). Alternatively, a continuous analog input is provided by potentiometer 603.

Another analog input is connected to the junction of photodiode 605 and resistor 606. This input provides feedback for control of the power level, depending on the placement of photodiode 605. When photodiode 605 is exposed to ambient light, the circuit acts to control the power to lamps to supplement the ambient light and maintain a preset illumination level. When photodiode 605 is exposed to direct light from the lamp, the circuit maintains the luminosity of the lamp at a predetermined level.

Appendix II, which forms a part of this disclosure, is the source code used for implementing a transmitter with an ST6010.

While a preferred embodiment of the present invention has been implemented using the following components, it is understood by those of skill in the art that various equivalent components can be substituted to obtain the same function.

| FIG. 2 | | FIG. 4 |
| --- | --- | --- |
| 42, 43, 71, 72 | 74HCT04 | 81, 82, 94, 102, 112 |
| 41, 62, 65, 75 | LM339 | 95, 101, 105 |
| 53 | 4013 | 91, 91, 103, 104 |
| 54 | 40194 | 93 |
| 70 | 2N4402 | — |

The present invention thus provides a power line communication system which does not use a carrier to send information. It removes power to transmit intelligence. The transmitter acts like a chopper working in bursts to encode data on the power line. The receiver acts like a variable duty cycle chopper to convey information on the control line. Cross-talk with other systems is avoided. In addition, devices downstream from the transmitter can be controlled independently. Noise in the notch is essentially eliminated since the receiver and load are disconnected from the power lines, the chief source of noise, during the notch. Data integrity is enhanced by requiring a predetermined sequence of zero crossings such that n bits of data are preferably transmitted by no more than n consecutive zero crossings.

Having thus described the present invention it will be apparent to one of ordinary skill in the art that various modifications can be made within the spirit and scope of the present invention. For example, while described in the context of operating with a "right shift" (least significant bit first), the direction of shift is immaterial as long as the system is consistent, e.g. $D_2$ and $D_3$ become the prefix bits for left shift. While it is possible to use a suffix to denote valid data, such is not preferred. While described in terms of a combination of discrete components and integrated circuits, it is understood by those of skill in the art that the transmitter and receiver are readily implemented as integrated circuits. While the preferred embodiment uses notches on consecutive half cycles of the alternating current, one could use consecutive cycles, e.g. four consecutive notches or two notches on consecutive, positive (or negative) going zero crossings; etc. Obviously, the transmission time is doubled if two cycles are used, tripled if three cycles are used, and so on.

Appendix I - Receiver

```
              $152
              JRZ:IZZ
LDIRR  #STRT  INCY
% DDR         JP:
$255          IZ
CALL:         CALL:    #IZZ
LDR           A/D
RETI          $4
WAT    #WAT   $4
JP:           $4
WAT           $4
SET@7  #INT   $4
% TSCR        $4
LDIRR         $4
$129          $4
$137          $4       #IR
CALL   #IA    $4
A/D           $4
LDAY          LDAY     #IW
CPIA          CPIA
$140          $140
JRZ:IZ        JRZ:IZZZ
INCY          DECY
JP:           JP:
IA            IZZ
CALL:  #IZ    CALL:    #IZZZ
A/D           A/D
LDA(Y)        LDA(Y)
SUBAR         COMA
$132          SUBAR
CALL:         $132
DECT          CALL:
CALL:         DECT
BITA          CALL:
LDAY          BITB
CPIA          LDAY
CPIA          RET
$152          LDIRR    #DNC
JRZ:IOUT      $159
INCY          $0
JP:           LDIRR
IZZZ          $158
CALL:  #IOUT  $0
OUT           $4
RETI          $4
JRR@7  #DECT  $4
% ACCU        $4
DA            RET
COMA          $4       #BITA
INCR          $4
% ACCU        $4
$4     #DA    $4
$4            $4
CPIA          LDAR
$32           $159
JRC:DC        CPIA
```

Appendix I - Receiver (continued)

```
JP:                    $64
ONC                    JRNC:BNC
CPIA   #DC             SET@0
$56                    $133
JRNC:DNCC              RET      #BNC
LDIA                   $4       #BITB
$56                    $4
ADDAR  #DNCC           $4
$159                   $4
LDRA                   $4
$159                   LDAR
JRNC:DX                $159
INCR                   CPIA
$158                   $64
$4     #DX             JRNC:BBNC
$4                     SET@1
$133                   $4
RET    BBNC            LDIRR
JRR@0  #OUT            $141
$133                   $4
OA                     LDIRR
JRR@1                  $142
$133                   $4
OA                     LDIRR
SET@0                  $143
$134                   $4
LDAR                   LDIRR
$134                   $144
ANDDIA                 $4
$99                    LDIRR
CPIA                   $145
$65                    $4
JRNZ:OA                LDIRR
LDAR                   $146
$134                   $4
ANDDIA                 LDIRR
$28                    $147
LDRA                   $4
% DR                   LDIRR
LDAR   #OA             $148
$134                   $4
ADDAR                  LDIRR
$134                   $149
LDRA                   $4
$134                   LDIRR
LDIRR                  $150
$133                   $4
$0                     LDIRR
RET                    $151
                       $4
LDIRR  #LDR            LDIRR
$140                   $152
$4                     DDR      $4
LDIRR                  DR       $0
$153                   ADDR     $12
$4                     ADSCR    $13
LDIRR                  TCR      $8
$154                   TSCR     $9
$4                     ACCU     $255
LDIRR
$155                   READY
$4
LDIRR
$156
$4
RET
JRR@7  #A/D
% TSCR
A/D
LDAR
% ADDR
LDRA
$132
LDIRR
% ADSCR
$61
LDIRR
% TSCR
$56
LDIRR
% TCR
```

-continued

Appendix I - Receiver

```
$75
RET
JP:
INT
JP:
STRT
```

Appendix II - Transmitter

| | | $24 | |
| --- | --- | --- | --- |
| | | JRR@0 | #W |
| LDIRR | #STRT | % DR | |
| % DDR | | W | |
| $254 | | JRS@0 | #WW |
| RES@7 | #R | % DR | |
| % DR | | WW | |
| LDIRR | | DECR | |
| $158 | | $157 | |
| $128 | | JRNZ:W | |
| LDIRR | | JP: | |
| $157 | | R | |
| $8 | | JRR@3 | #A/D |
| LDAR | | % ADSCR | |
| $158 | | A/D | |
| ADDAR | #NZ | LDAR | |
| % ACCU | | % ADDR | |
| JRNC:NC | | LDRA | |
| CALL: | | $132 | |
| NOTC | | LDIRR | |
| DECR | | % ADSCR | |
| $157 | | $61 | |
| JRNZ:NZ | | RET | |
| JRR@0 | #NC | LDIRR | #TMR |
| % DR | | % TSCR | |
| NC | | $60 | |
| JRS@0 | #V | LDIRR | |
| % DR | | % TCR | |
| V | | $48 | |
| DECR | | JRR@7 | #TB |
| $157 | | % TSCR | |
| JRZ:OUT | | TB | |
| JP: | | RET | |
| NZ | | JRS@0 | #NOTC |
| LDIRR | #OUT | % DR | |
| $157 | | NOTC | |
| LDIRR | | | |
| $156 | | JP: | |
| $32 | | STRT | |
| DECR | #NX | DDR | $4 |
| $156 | | DR | $0 |
| JRNZ:NX | | ADDR | $12 |
| SET@7 | | ADSCR | $13 |
| JRR@0 | #NA | TCR | $8 |
| % DR | | TSCR | $9 |
| NA | | ACCU | $255 |
| CALL: | | | |
| TMR | | | |
| RES@7 | | | |
| % DR | | | |
| LDIERR | | | |
| $159 | | | |
| $32 | | | |
| DECR | #NDD | | |
| $159 | | | |
| JRNZ:NDD | | | |
| SET@7 | | | |
| % DR | | | |
| JRS@0 | #NBB | | |
| % DR | | | |
| NBB | | | |
| CALL: | | | |
| TMR | | | |
| RES@7 | | | |
| % DR | | | |
| LDIRR | | | |
| $159 | | | |
| $32 | | | |
| DECR | #NEE | | |

Appendix II - Transmitter

```
$159
JRNZ:NEE
RET
```

What is claimed is:

1. A communication system for transmitting bits of data an AC power lines comprising:

a transmitter having switch means connected in series with at least one of said power lines and control means for rendering said switch means non-conductive for predetermined periods during cycles of said alternating current in accordance with the bits of data;

the control means comprising:

first clock pulse generating means for generating first clock pulses in response to each zero crossing of said alternating current;

second clock pulse generating means for generating second clock pulses in response to alternate zero crossings of said alternating current;

combining means for combining said first and second clock pulses to produce a control signal for rendering said switch means non-conductive;

a receiver connected with said AC power lines downstream of said transmitter, the receiver having detection means for detecting whether current on the AC power lines have been interrupted;

whereby during each of said predetermined period when said switch means is non-conductive an interruption of power occurs which is detected by said receiver.

2. The communication system as set forth in claim 1 wherein a plurality of bits of data are transmitted in consecutive cycles of said alternating current.

3. The communication system as set forth in claim 1 wherein control means renders said switch means non-conductive for predetermined periods twice during a given cycle of said alternating current for encoding a predetermined logic level.

4. The communication system as set forth in claim 1 wherein said receiver means comprises:

means for detecting the duration of the periods when said switch means is non-conducting.

5. The communication system as set forth in claim 1 wherein said second clock pulses are phase shifted relative to the zero crossings of said alternating current.

6. The communication system as set forth in claim 1 wherein said second clock pulses are delayed relative to the zero crossings of said alternating current.

7. A receiver for use in a system for controlling lighting devices powered from AC power lines by transmitting bits of control data on said AC power lines, the receiver comprising:

power interruption detector means for producing a pulse in response to each interruption of said alternating current;

pulse duration detection means coupled to the output of said zero crossing detector means for producing a pulse only when the duration of a pulse from said power interruption detector means exceeds a predetermined time;

shift register means coupled to the output of said pulse duration detection means for storing data, said shift register means having parallel data outputs;

logic means coupled to the outputs of said shift register means for analyzing the content of said data;

data register means coupled to the output of said logic means and said shift register means for selectively storing data under the control of said logic means;

timing means coupled to said data register means for producing a pulse width modulated signal in response to said data; and switch means for connection to one of said AC power lines and responsive to said pulse width modulated signal for being selectively rendered conductive or non-conductive.

8. In a system for communicating over AC power lines, a transmitter comprising:

zero crossing detector means for producing a pulse in response to each zero crossing of said alternating current;

pulse generating means coupled to said power lines for producing pulses synchronized with and at the same frequency as said alternating current;

shift register means for storing data representative of a predetermined power level;

control means connected to said shift register means for causing said data to be serially read out from said shift register means as a series of pulses;

logic means coupled to said zero crossing detector means, said pulse generating means, and said shift register means for combining the outputs thereof to produce a control signal comprising pulses; and switch means in series with at least one of said AC power lines and responsive to said control signal for being selectively rendered conductive or non-conductive.

9. The system for communicating over AC power lines as set forth in claim 8 wherein some of the data inputs to said shift register means are kept at a fixed voltage to provide the same data on successive loadings of said shift register means and wherein some of the data inputs to said shift register means are not at a fixed voltage to provide variable data on successive loadings of said shift register means.

10. The system for communicating over AC power lines as set forth in claim 8 wherein said logic means includes timing means for determining the duration of pulses in said control signal.

11. The system for communicating over AC power lines as set forth in claim 10 wherein said logic means further comprises timing means for controlling the interval during which said control signal is applied to said switch means.

12. In a system for communicating over AC power lines, a receiver comprising:

zero crossing detector means for producing a pulse in response to each zero crossing of said alternating current;

pulse duration detection means coupled to the output of said zero crossing detector means for producing a pulse only when the duration of a pulse from said zero crossing detector means exceeds a predetermined time;

shift register means coupled to the output of said pulse duration detection means for storing data, said shift register means having parallel data outputs;

logic means coupled to the outputs of said shift register means for analyzing the content of said data;

data register means coupled to the output of said logic means and said shift register means for selectively storing data under the control of said logic means;

timing means coupled to said data register means for producing a pulse width modulated signal in response to said data; and switch means connected to one of said AC power lines and responsive to said pulse width modulated signal for being selectively rendered conductive or non-conductive.

* * * * *